United States Patent [19]
Hansen et al.

[11] 4,211,397
[45] Jul. 8, 1980

[54] UNIT DOCUMENT FEEDING MECHANISM

[75] Inventors: Gary G. Hansen, Byram; Leonard M. Pengue, Huntington; Theodore Watkin, Stamford, all of Conn.

[73] Assignee: Pitney Bowes, Inc., Stamford, Conn.

[21] Appl. No.: 950,081

[22] Filed: Oct. 10, 1978

Related U.S. Application Data

[62] Division of Ser. No. 712,233, Aug. 6, 1976, Pat. No. 4,143,981.

[51] Int. Cl.² .............................................. B65H 5/06
[52] U.S. Cl. ........................................ 271/4; 271/265; 271/266; 271/270; 271/314
[58] Field of Search ............... 271/266, 270, 265, 272, 271/273, 274, 269, 110, 80, 3, 4, 10, 14; 400/596, 602, 708, 708.1, 583, 583.1, 582; 101/233, 232

[56] References Cited
U.S. PATENT DOCUMENTS

| 2,156,990 | 5/1939 | Keen ........................................ 400/583 |
| 3,581,000 | 5/1971 | Hansen et al. .................... 271/266 X |
| 3,907,282 | 9/1975 | Hunter ............................. 271/266 X |

*Primary Examiner*—Bruce H. Stoner, Jr.
*Attorney, Agent, or Firm*—Peter Vrahotes; William D. Soltow, Jr.; Albert W. Scribner

[57] ABSTRACT

Disclosed is a mechanism for feeding unit documents, such as sheets, envelopes, pages, cards, and the like to an apparatus for processing. A mechanism is provided for feeding the documents to and removing them from the operating apparatus at a relatively high rate of speed. During the time that an individual document is being operated upon it is conveyed by a mechanism associated with the operating apparatus. Examples of such operations would be printing addresses on an envelope, embossing credit cards, encoding magnetic tapes, and the like. Upon conclusion of the operation, the documents are removed quickly so that a second document may be supplied to the operating apparatus expeditiously.

5 Claims, 7 Drawing Figures

UNIT DOCUMENT FEEDING MECHANISM

This is a division of application Ser. No. 712,233, filed Aug. 6, 1976, now U.S. Pat. No. 4,143,981.

BACKGROUND OF THE INVENTION

A. Field of the Invention

In the processing of documents wherein an operation is imposed thereon, it is advantageous to provide feeding means for rapidly supplying such a document to the operating apparatus, having conveying means associated with the apparatus that conveys the document during its operation, and means for quickly removing the document from the apparatus upon completion of the operation. Examples of such operations would be printing a sheet of paper or envelope, embossing a plastic card, or encoding a magnetic tape attached to a card or sheet. This invention will be described with reference to a combination of conveying means and printer wherein individual sheets may be rapidly fed to the printer and quickly discharged therefrom upon completion of the printing.

B. Prior Art

This invention will be described in conjunction with printing apparatus of the type described in U.S. Pat. Nos. 2,918,865 and 3,742,848. Therein are shown chain printers wherein a single sheet of paper of considerable length is printed. It is known that these chain printers are high speed devices wherein a high degree of information may be printed in a short period of time. Heretofore, no satisfactory means has been provided wherein these printers may be utilized with individual sheets as opposed to one continuous web, or roll of paper, upon which the printer continually operates. Obviously, it would be advantageous to provide means for utilizing this type of printer along with means for rapidly supplying sheets to the printer and quickly removing them therefrom subsequent to the printing operation. This is opposed to having a roll of paper in which the portion to be printed passes through the printer and then must subsequently be severed.

SUMMARY OF THE INVENTION

The apparatus used to exemplify the instant invention comprises three components, means for supplying a unit document to a printer, a printer, and means for removing the unit document from the printer. The supplying means comprises a hopper having means for segregating unit documents from a stack to be fed individually to the threshold of a printer. A pair of arms feeds the unit document to the conveying means of the printer. The conveying means of the printer then controls the movement of the document through the printer during the time the appropriate information is being printed thereon. Upon completion of the printing operation, means downstream from the printer is provided to override the conveying means of the printer and to rapidly remove the document so that the next document may be supplied to the printer with no unnecessary loss of time. This type of document handling and printing apparatus may be operated in conjunction with an output control panel and a microprocessor, electronics, or other intelligent controller so that selected information may be printed upon the unit documents.

BRIEF DESCRIPTION OF THE DRAWING

In the ensuing detailed description of the invention, reference may be had to the accompanying drawing in which.

DETAILED DESCRIPTION OF THE ILLUSTRATED EMBODIMENT

Figure 1:
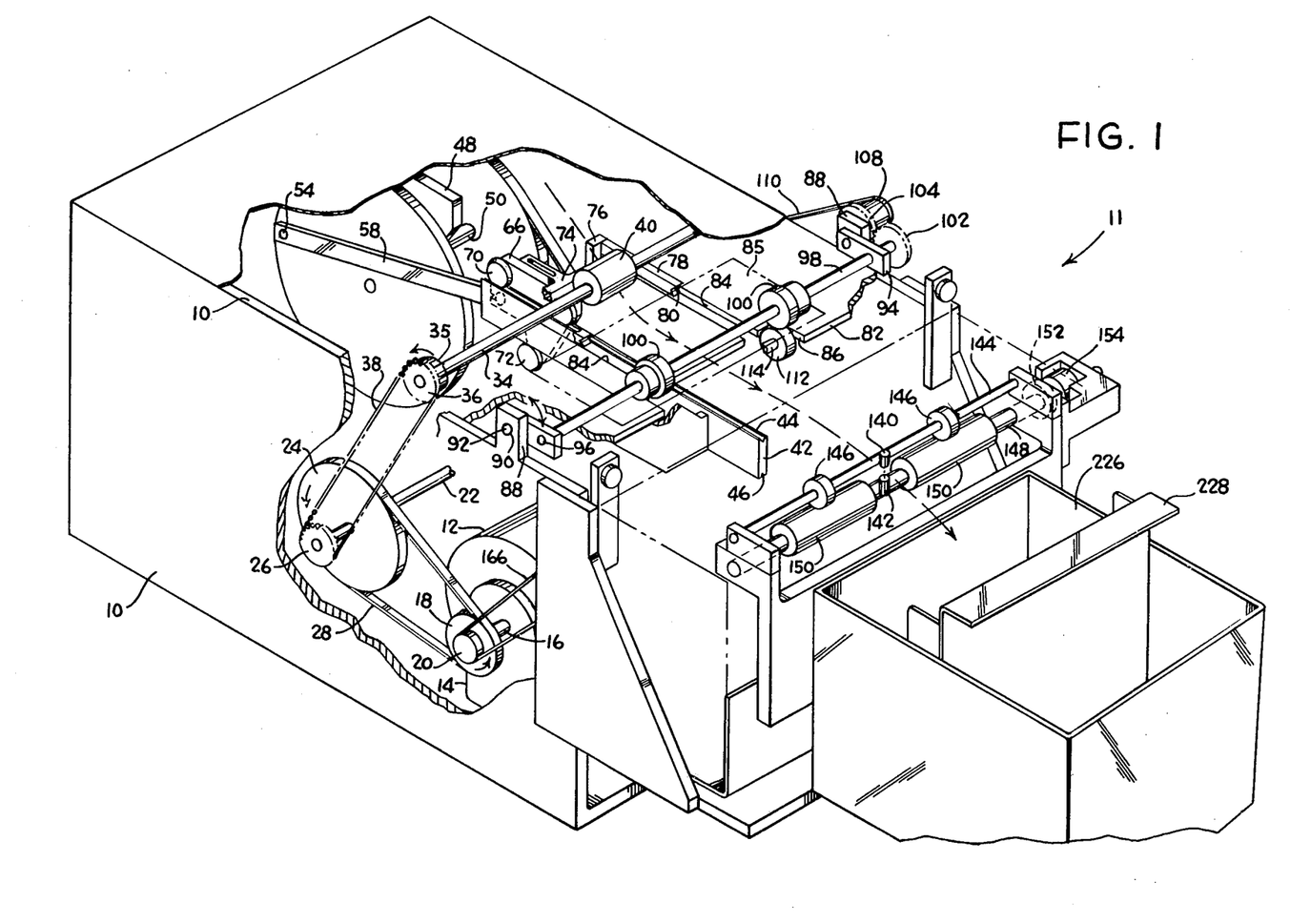
FIG. 1 is a perspective view of a document conveying apparatus, with parts deleted or cut away for clarity, which encompass the principles of the instant invention.
Figure 2:
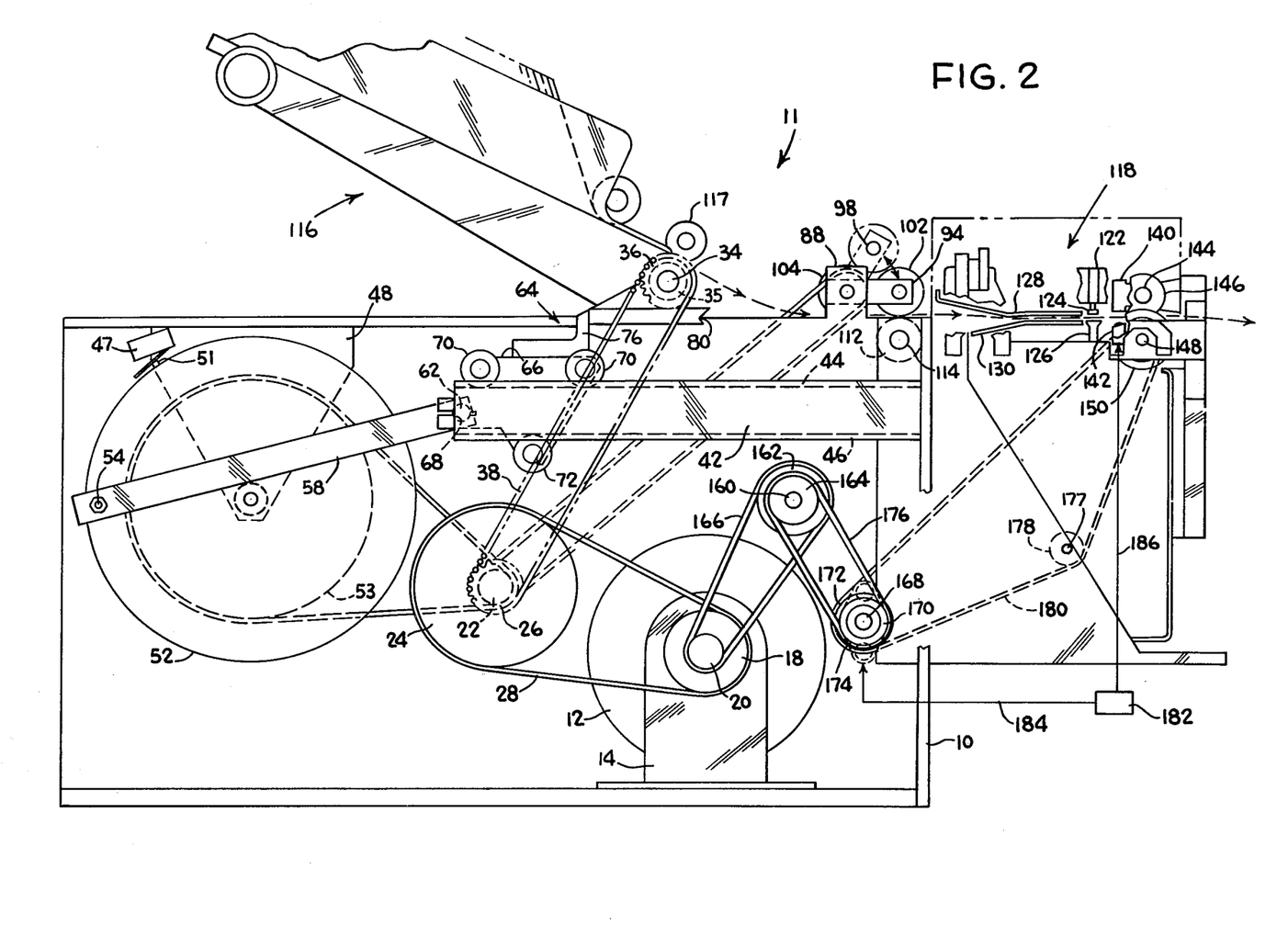
FIG. 2 is a longitudinal cross-sectional view of the apparatus shown in FIG. 1 together with a portion of the electronic control means shown diagrammatically.
Figure 3:
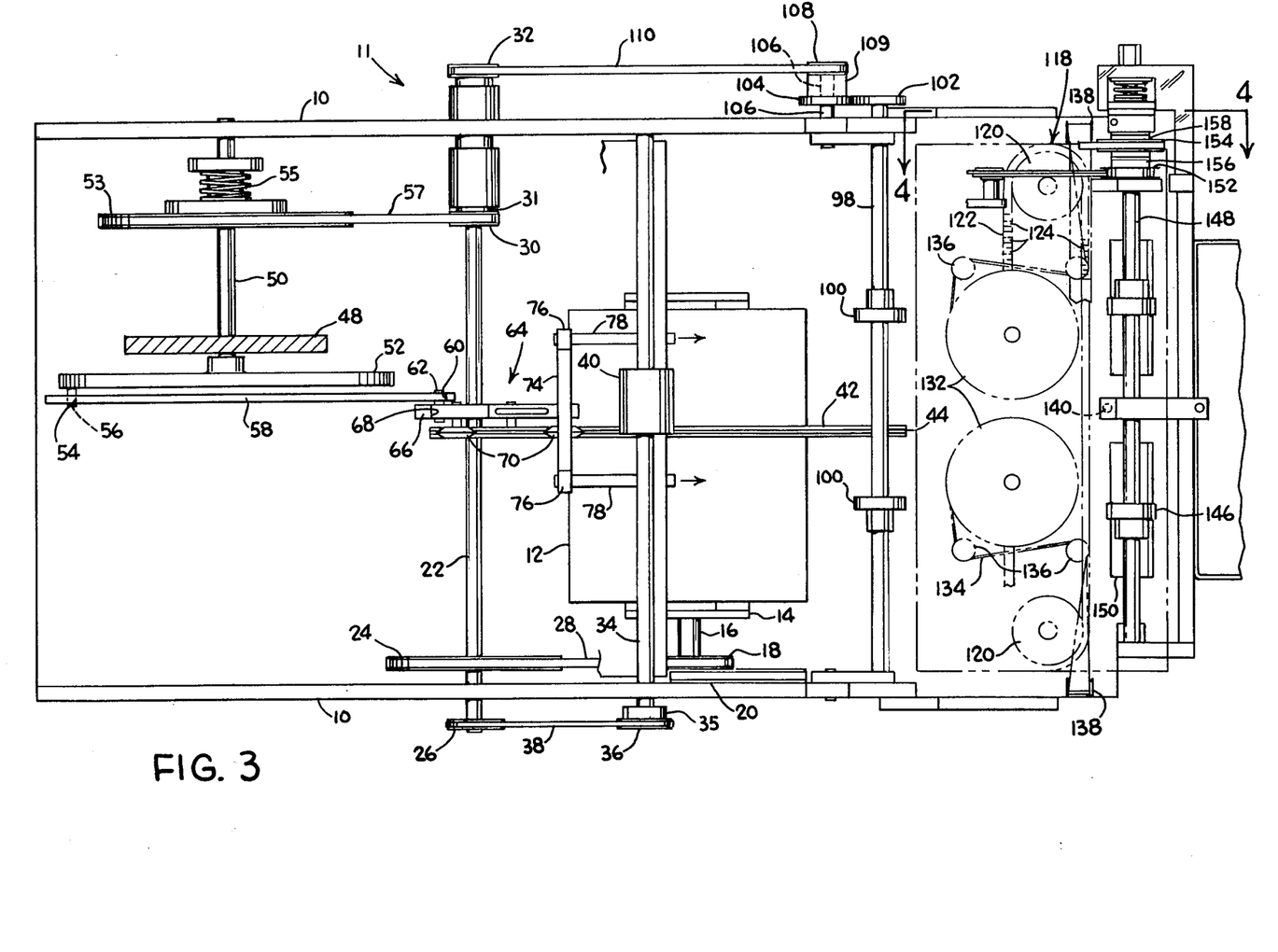
FIG. 3 is a top plan view of the apparatus shown in FIG. 1.

Referring now to FIGS. 1-3, an illustrated embodiment of a unit document feeding mechanism for conveying documents, such as sheets, envelopes and pages, to and away from a printer is shown generally at 11. The printer is not shown in FIG. 1 for purposes of clarity but parts of the printer are shown in FIGS. 2-5. A detailed description of the printer utilized with this embodiment is not shown nor described as it is not believed necessary to the description of the applicant's invention. Reference may be had to the aforementioned U.S. Pat. No. 2,918,865 and 3,742,848 for details as to the functioning of the type of chain printer which may be utilized in conjunction with the invention. In the ensuing description, only those parts of a printer are illustrated which have been altered for the objects of this invention or which from necessity must be shown.

The illustrated embodiment comprises a housing 10 having disposed therein a motor 12 which is supported by a pair of braces 14. A drive shaft 16 extends from the motor 12 and has connected thereto a pair of pulleys 18 and 20. A shaft 22 is rotatably supported within the housing 10 and has a pulley 24 and sprocket 26 fixedly attached to one end, the pulley being located inside the housing 10 and the sprocket outside thereof. A belt 28 is trained about the pulleys 18 and 24 to provide drive to the shaft 22. A pair of pulleys 30 and 32 are mounted on the shaft 22 at the other end thereof, the pulley 30 being located within the housing 10 and the pulley 32 being located outside thereof. The pulley 30 is rotatably mounted on the shaft 22 while pulley 32 is fixedly mounted thereon. A clutch 31 is carried by the shaft 22 and is operative to couple the pulley 30 to the shaft 22. Another shaft 34 is rotatably supported by the housing 10 and has a sprocket 36 rotatably located at one end thereof, which sprocket is located outside the housing 10. A clutch 35 is provided to couple the sprocket 36 to the shaft 34. A roller 40 is fixedly secured to the shaft 34 intermediate its ends. A chain 38 is trained about the sprockets 26 and 36 to provide the drive to the shaft 34 when the clutch 35 is coupled.

A track member 42 having an upper track 44 and a lower track 46 therein is rigidly secured within the housing 10. A switch 47 is located on the underside of the ceiling of the housing 10 upstream from the track 42. A brace 48 depends from the housing 10 adjacent to the switch 47 and rotatably receives a shaft 50, one end of the shaft also being rotatably supported by the housing 10. Secured to the opposite end of the shaft 50 in alignment with the switch 47 is a fly wheel 52 which has a projection 51 mounted on its perimeter that is operative to engage the switch. Mounted intermediate the ends of the shaft 50 is a pulley 53 and a brake 55. A belt 57 is trained about the pulleys 30 and 53 to provide drive to the shaft 50 from the motor 12 upon coupling of the clutch 31. A pin 54 extends from the perimeter of the fly wheel 52 and is received within an opening 56 which is located at one end of a connecting bar 58. The opposite end of the connecting bar 58 also has an opening 60 which receives a pin 62 that is secured to a pusher assembly generally shown at 64. The pusher assembly 64 has a generally delta-shaped frame 66 having an opening 68 that rotatably receives the pin 62. Secured to the upper part of the frame member 66 and received within the upper track 44 are a pair of wheels 70. Supported at the lower portion of the frame 66 and received within the track 46 is a lower wheel 72. A generally T-shaped member 74 is secured to the top of the frame 66 and has a pair of vertical extensions 76 each of which supports a horizontally extending pusher arm 78. Each of the arms 78 has a V-shaped end 80.

Located above the track 42 is a deck 82 (see FIG. 1) having a pair of elongated openings 84 therein each of which receives a pusher arm 78. The deck 82 also has a cut-out portion 86 therein. An envelope 85 is shown on the deck 82 for purposes of illustration.

A pair of lugs 88 project from the housing 10, one at each side thereof and each has an opening 90 therein. Each opening 90 rotatably receives a pin 92 and each pin is secured to an arm 94 so that the arms may be pivoted relative to about the lug 88. Each of the arms 94 has an opening 96 which rotatably receives a shaft 98. A pair of rollers 100 are supported by the shaft 98 intermediate the arms 94. The rollers 100 extend into the cut-out portion 86 of the deck 82, the lower perimeter of the rollers being substantially flush with the upper surface of the deck when the arms 94 are in their lowermost position. Secured to one end of the shaft 98, outside of the housing 10, is a gear 102. The gear 102 engages another gear 104 which is supported by a shaft 106 and connected to a pulley 108 through a clutch 109 connection. A belt 110 is trained about pulleys 32 and 108 to thereby provide drive to the shaft 98 from the shaft 22 when the clutch 109 is coupled. A pair of rollers 112 (only one being shown) are received within the deck cut out portion 86 in alignment with the rollers 100 and are mounted for rotation on a shaft 114 which is supported by the housing 10.

Disposed above and supported by the housing is a sheet supplying device 116 having a presser roller 117 associated therewith which cooperates with the roller 40 to feed an envelope 85 to the deck 82 as needed.

The sheet supplier 116 may be of any conventional type and will not be described in detail. An example of the type of sheet feeding device which may be utilized is described in U.S. Pat. No. 2,762,623. The switch 47 located at the upstream end of the pusher assembly 64 is electrically connected to the sheet supplier 116 so that when engaged by the pin 51 it will enable the sheet supplier to supply an envelope 85 to the deck 82.

Located downstream from the rollers 100 and 112 is a chain printer 118 of the type shown and described in the aforementioned U.S. Pat. No. 2,918,865 and 3,742,848. The printer has a pair of sprockets 120 about which a print chain 122 is trained, the chain has a plurality of type character members 124. Located below the type members 124 are a plurality of impacters 126 which cooperate with the type members 124 in order to print upon an envelope 85 disposed therebetween. The printer 118 is provided with an upper guide member 128 and a lower guide member 130 which guide sheets intermediate the type members 124 and impacters 126. Rotatably supported by the printer 118 are a pair of spaced spools 132 which supply an ink ribbon 134 that is conveyed intermediate the type members 124 and the impacters 126. A plurality of vertically extending guide posts 136 is provided to guide the ink ribbon 134 and a pair of opposed horizontally extending guide posts 138 cooperate with one another and with the vertically extending guide posts to change the direction of the ribbon from a vertical inclination to a horizontal inclination so that the ink ribbon 134 may be positioned and conveyed intermediate the type members 124 and the impacters 126.

Downstream from the print chain 122 is a means for detecting the leading and trailing edge of an envelope 85 comprising a light 140 disposed over a photocell 142. Downstream from the photocell 142 is an upper shaft 144 rotatably supported by the housing 10 and having disposed thereon a pair of rollers 146. Immediately below the upper shaft 144 is a lower shaft 148 having a pair of rollers 150 mounted thereon for rotation therewith. The shaft 148 is rotatably supported by the housing and has one end which extends therethrough. Mounted on the exposed end of the shaft 148 are a pair of members 152 and 154, each member having a one-way clutch 156 and 158, respectively, associated therewith.

Rotatably supported within the housing 10 is a shaft 160 (See FIG. 2) which has a pair of pulleys 162 and 164 supported thereon for rotation therewith. A belt 166 is trained about the pulleys 20 and 162 to provide drive from the motor 12 to the shaft 160. Another shaft 168 is rotatably supported within the housing and has a pair of pulleys 170 and 172 mounted on opposite ends thereof. One of the pulleys 172 has a clutch 174 associated therewith. A belt 176 is trained about the pulleys 164 and 170 thereby providing drive to the shaft 168. Rotatably supported by a shaft 177 within the housing is a pulley 178. A belt 180 is trained about the pulleys 172, 178 and 154 to provide drive to the pulley 154 when the clutch 174 is coupled.

A control circuit unit 182 is provided to energize the clutch 174 and is in electrical connection with the clutch through a lead 184. The control circuit unit 182 is also an electrical connection with the photocell 142 through a lead 186. Through such a control circuit unit 182, the clutch 174 may be made to couple or decouple depending upon the presence or absence of a sheet intermediate the light 140 and photocell 142. This control circuit unit 182 is also electrically connected to the clutches 31,35, the brake 55 and the sheet supplying device 116, such connections not being shown for purposes of clarity and convenience.

Figure 4:
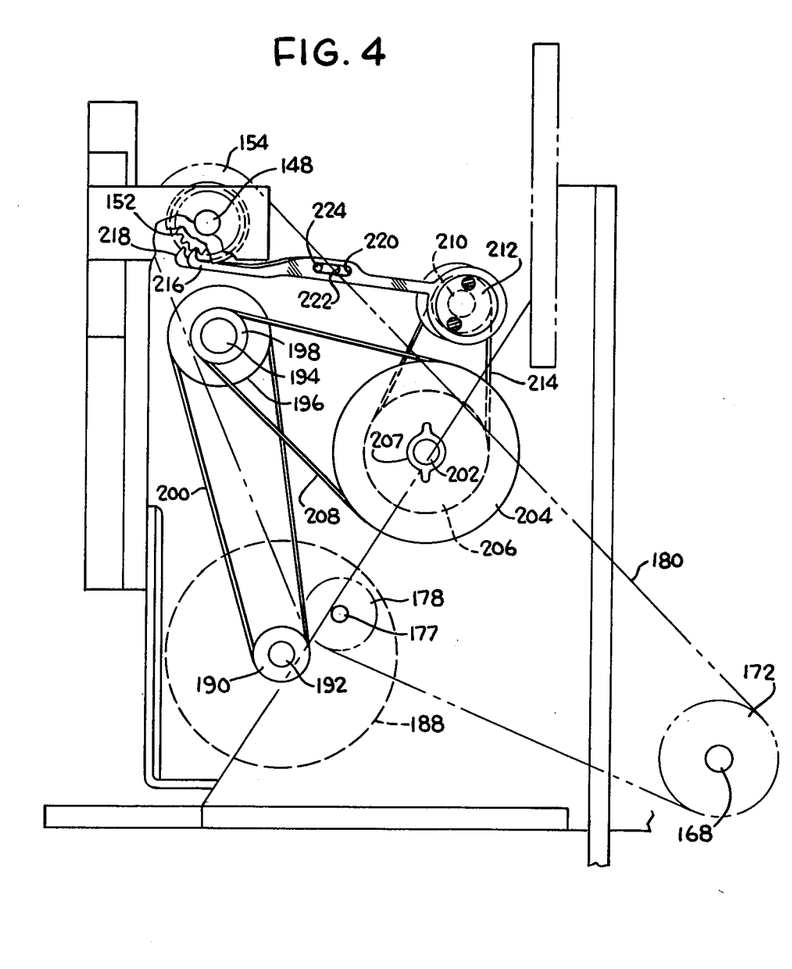
FIG. 4 is a cross-sectional view of a portion of the apparatus shown in FIG. 3 taken along the lines 4—4.
Figure 5:
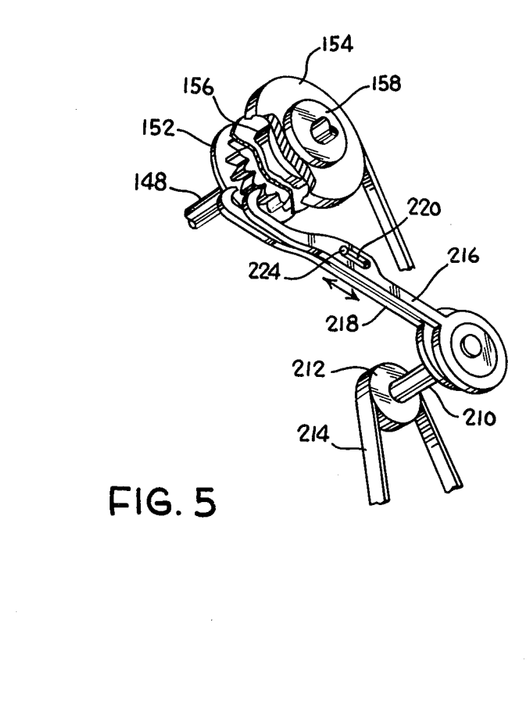
FIG. 5 is a perspective view showing details of a portion of the printer conveying mechanism shown in FIG. 4.

Referring now to FIG. 4, the printer 118 is provided with a motor 188 and a pulley 190 is mounted on the drive shaft 192 of this motor. A shaft 194 is rotatably supported by the printer 118 and supports a pair of pulleys 196 and 198. A belt 200 is trained about the pulleys 190 and 196 to provide rotational drive to the shaft 194. The shaft 194 provides drive to one of the sprockets 120 through appropriate linkage (not shown) thereby providing drive to the print chain 122. Another shaft 202 is rotatably supported within the printer 118 and has a pair of pulleys 204 and 206 mounted thereon, the latter pulley 206 having a clutch 207 associated therewith, which clutch is electrically connected to the electronic controller 182. A belt 208 is trained about the pulleys 198 and 204 to provide drive to the shaft 202. Another shaft 210 is rotatably supported in the printer 118 and has a pulley 212 connected thereto. A belt 214 is trained about the pulleys 206 and 212 to provide drive to the shaft 210 when the clutch 207 is coupled.

A pair of pawls 216 and 218 are eccentrically mounted on the shaft 210 so as to be out of phase with one another as they are actuated by the shaft when the same is rotating. Each of the pawls 216 and 218 has an opening 220, respectively, therein which openings receive a support pin 224 thereby allowing the pawls to move in the direction shown by the arrows in FIG. 5. The pawls, through their eccentric motion, are able to alternately engage and drive the gear 152 which in turn drives the shaft 148. This causes rotation of the rollers 150 which then can convey envelopes as they are being printed.

Downstream from the printer 118 is a hopper 226 which has an adjustable divider 228. The hopper 226 receives envelope 85 or sheets being discharged from the printer 118 and the extent of the receiving portion of the hopper mmay be adjusted by movement of the adjustable divider 228 to accommodate documents of different sizes.

Figure 6:
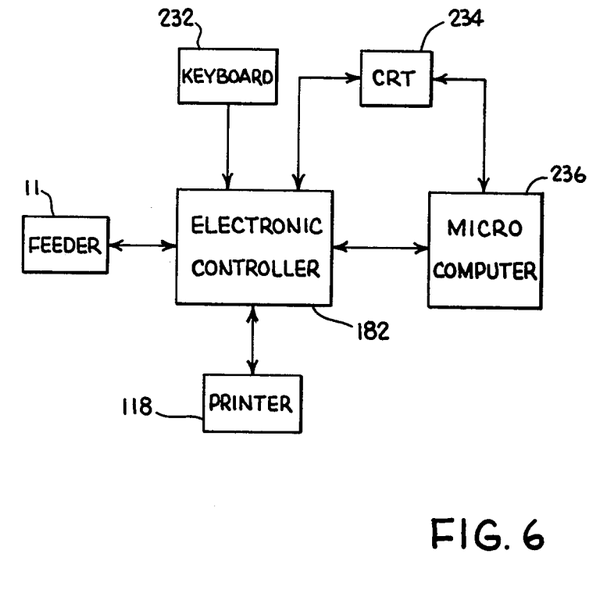
FIG. 6 is a block diagram of a control system for the apparatus shown in FIGS. 1-5.

Referring now to FIG. 6, a block diagram is shown that includes components for controlling the printer and feeder shown in FIGS. 1-5. Information is supplied from a keyboard 232 through the electronic controller 182 to a microcomputer 236 where such information is stored. Information being supplied to the electronic controller and microcomputer 236 may be viewed visually on a cathode ray tube (CRT) 234.

Figure 7:
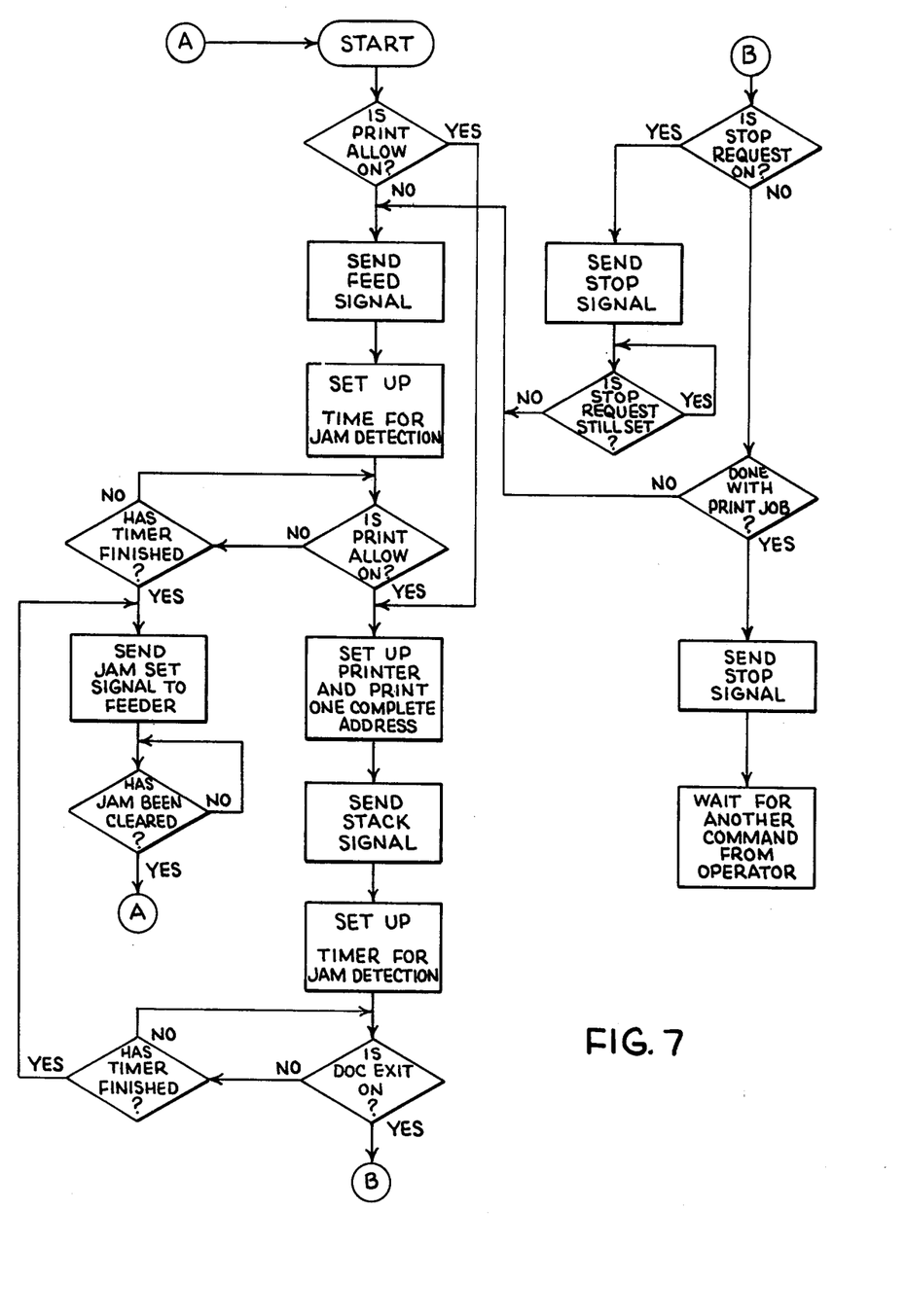
FIG. 7 is a flow chart of the control system of FIG. 6.

FIG. 7 shows a flow chart wherein the various steps and procedures which are carried out by the electronic controller 182 and the computer 236 are illustrated.

In operation, the operator would indicate through the keyboard 232 the operation which is to be performed. For example, assuming that a plurality of envelopes 85 are to have addresses printed thereon, the operator would indicate through the keyboard which address or which group of addresses are to be printed, this information being visible on the CRT 234 to assure correctness. This information would have been programmed previously into the microcomputer 236 to be accessed as required.

At this junction, the major control of the printer 118 and feeder 116 supplying drive would be under the control of the microcomputer 236 in cooperation with the electronic controller 182. A signal from the electronic controller 182 causes the sheet supplier 116 to be energized thereby supplying an envelope 85 to the deck 82. At this junction, or any time previously, the motor 12 of the feeder 11 is enabled thereby providing drive to the various components of the feeder.

With the enabling of the motor 12 the drive shaft 16 rotates the pulleys 18 and 20. Because of the belt 28 connection between the pulley 18 and the pulley 24, shaft 22 is rotated. With the feeding of an envelope 85 to the deck 82, a signal is sent from the electronic controller 182 to the clutch 31 to couple pulley 30 to shaft 22 thereby providing drive to the pulley 30. At the same time, a signal is sent from the electronic controller 182 to the brake 55 to disengage the brake from shaft 50, thereby releasing this shaft for rotation. With the rotation of pulley 30, pulley 53 is driven causing rotation of the flywheel 52.

As the flywheel 52 is rotated, it carries the pin 54 therealong to drive the connecting bar 58 initially into forward motion. Since the connecting bar 58 engages the pusher assembly 64 through the pin 62 that is received by the frame member 66, the pusher assembly 64 will be moved from its rest position horizontally forward (to the right as seen in FIGS. 2 and 3) with the upper wheels 70 rolling within the groove 44 and the lower wheel 72 moving within the groove 46. As the pusher assembly 64 is moved forward from its rest position, the V-shaped ends 80 of the pusher arm 78 will engage one edge of an envelope 85, which had been deposited on the deck 82 by the sheet supplier 116, to convey the envelope to the nip of the rollers 146 and 150. Upon delivering the envelope 85 to the rollers 146 and 150, the pusher assembly 64 will move away from the printer 118 by the continued rotation of flywheel 52 until the pusher assembly 64 reaches its rest position where projection 51 will enable switch 47. With the engagement of switch 47, signals are sent to disengage the clutch 31, apply the brake 55 and couple the clutch 35 of the supply device 116 which results in braking the flywheel and feeding an envelope 85 from the supplying device 116 to the deck 82. At the same time, the clutch 174 couples the pulley 172 to the shaft 168 to provide drive to the shaft 148 through the pulley 154 thereby rotating the rollers 150 to convey an envelope 85 through the printer 118 until the leading edge of the envelope 85 is sensed by the light 140, photocell 142 combination which enables the printer 118 through the electronic controller 182. An adjustable time delay is provided in the electronic controller 182 so that the leading edge of the envelope 85, or any other document, may be fed a selective distance past the photocell 142 by the drive of shaft 168 before the printer is enabled. This allows adjustment for different number of lines to be printed or different size documents. When the clutch 174 is disengaged through the electronic controller 182 upon the placing of the envelope in the printing position, the shaft 168 rotates freely relative to the pulley 170, consequently discontinuing any drive from the motor 12 to the lower roller 150. It will be noted that when shaft 148 is being driven by pulley 154, the gear 152 is overdriven due to the presence of the one way clutch 156 associated with this gear.

The drive of the printer 118 then takes over the conveyance of the envelope 85 through the printer which drive is controlled by the electronic controller in cooperation with the microcomputer 236. This drive is accomplished by the clutch 207 being coupled to the shaft 202 to drive shaft 210. With the rotation of the shaft 210, pawls 216, 218 are driven to alternately engage and drive the gear 152. With this driving of the gear 152, shaft 148 is rotated to drive rollers 150, thereby advancing the envelope 85 that is located within the printer. When the envelope 85 reaches the position where the first line is to be printed by the combination of type members 124 and impacters 126, the computer 236 sends a signal which deenergizes clutch 207 thereby discontinuing the drive to shaft 202 from pulley 206 and terminating the movement of the pawls 216,218. At this time, a line is printed upon the envelope 85 through cooperation of the type members 124 and impactors 126. Following completion of this line printing, the clutch 207 is once more energized to allow drive between the shaft 202 and pulley 206 to thereby activate the pawls 216,218 to continue the drive a distance necessary for the printing of another line. This process is repeated for each line until the complete information is printed upon the envelope 85.

Upon completion of the printing operation, the electronic controller once more energizes the clutch 174 to provide drive to the shaft 148 as described previously. Because of the one way clutch 156, shaft 148 is able to drive through the gear 152 to convey the envelope 85 out of the printer 118 and into the hopper 226. It will be appreciated that the shaft 148 drives rollers 150 at a relatively high speed so that an envelope 85 is rapidly removed from the printer. As the envelope departs from the printer 118, its trailing edge is sensed by the light 140, photocell 142 combination which becomes unblocked and generates a document exit signal, "DOC EXIT" of FIG. 7, which is delivered to the microcomputer 236. If the photocell 142 does not become unblocked in a given time increment, a first "JAM SET" signal is given which terminates all activities.

After the signal is received indicating that the photocell is unblocked, a signal is sent from the electronic controller 182 to the clutch 31 to couple the pulley 30 with the shaft 22 and another signal is sent simultaneously to the brake 55 to release the same to thereby provide drive to the flywheel 52. With such drive, the pusher assembly once more will move forward to push an envelope 85 disposed upon the deck, as described previously, between the guide elements 128, 130 and into the printer 118. During this feeding of the envelope 85 to the printer 118, the micro-computer 236 will time the feeding and if the photocell 142 does not become blocked within the set time, a second "JAM SET" signal will be sent to the controller 182 to terminate all activities until this jam is cleared. With the envelope 85 inserted into the printer, the pusher assembly will once more retract until it reaches its original position to engage the projection 51 to enable the switch 47 which will send signals to this brake 55, and the clutch 31, 35 as previously described.

The preferred embodiment has been described thus far in conjunction with the feeding of envelopes 85. Means is also provided for feeding sheets of greater length. As stated previously, the arm 94 is pivotable relative to the lug 88 through the pin 92. With the arm 94 in its upward position, the rollers 100 are clear of the platform 82 and the pusher assembly 64 is free to operate. When sheets of greater length are to be fed, the arm 94 is lowered and the rollers 100 are placed into operational engagement with the lower rollers 112. A switch is thrown on the keyboard so that a second mode of operation is enabled involving the gears 102, 104 and the clutch 109. A command is given to supply a sheet to the printer 118 when the trailing edge of a departing sheet is detected by the photocell 142. At this junction, the clutch 109 is coupled to drive the shaft 98 and its attached rollers 100. In this way, a sheet which has been placed to the platform by the sheet applying device 116 will be conveyed into the printer 118. Upon detection of the leading edge of the photocell 142, the clutch 109 will be decoupled and the drive to rollers 100 discontinued. By this time, the sheet will have been delivered to the rollers 146, 150 and the printing will take place as described previously.

What is claimed is:

1. Unit document conveying apparatus for conveying documents to and from a work station, the combination comprising:
    A. a housing having:
        1. a platform;
        2. a first motor supported by said housing;
        3. document drive means located at said platform;
        4. means connected to said motor for selectively operating said drive means to convey a document across said platform upon actuation thereof;
    B. means for feeding documents individually onto said platform; and
    C. a work station operative to perform work on a document secured to said housing downstream from said platform and having:
        1. a document receiving surface parallel to and in tandem with said platform;
        2. a shaft having a drive roller thereon located adjacent said surface and having first and second drive members connected thereto, said first drive member being operative to drive said shaft faster than said second drive member, said second drive member having a one way clutch associated therewith that allows said faster rotating drive member to override said slower rotating drive member to rotatably drive said shaft, said drive roller engaging documents to transport the same across said document receiving surface at one speed when driven by said first drive member and at a slower speed when driven by said second drive member;
        3. a second motor;
        4. first drive connection for selectively connecting said first drive member to said first motor; and
        5. second drive connection connecting said second drive member to said second motor.

2. The apparatus of claim 1 wherein said document drive means is a pusher mechanism and said operating means causes said pusher mechanism to reciprocate from a rest position, across said platform and back to said rest position.

3. The apparatus of claim 2 including means for enabling said feeding means in response to said pusher mechanism being returned to its rest position.

4. The apparatus of claim 2 including means for braking said operating means when said pusher mechanism is returned to its rest position.

5. The apparatus of claim 1 including means for sensing the presence of a document on the platform of said work station.

* * * * *